Figure 1:
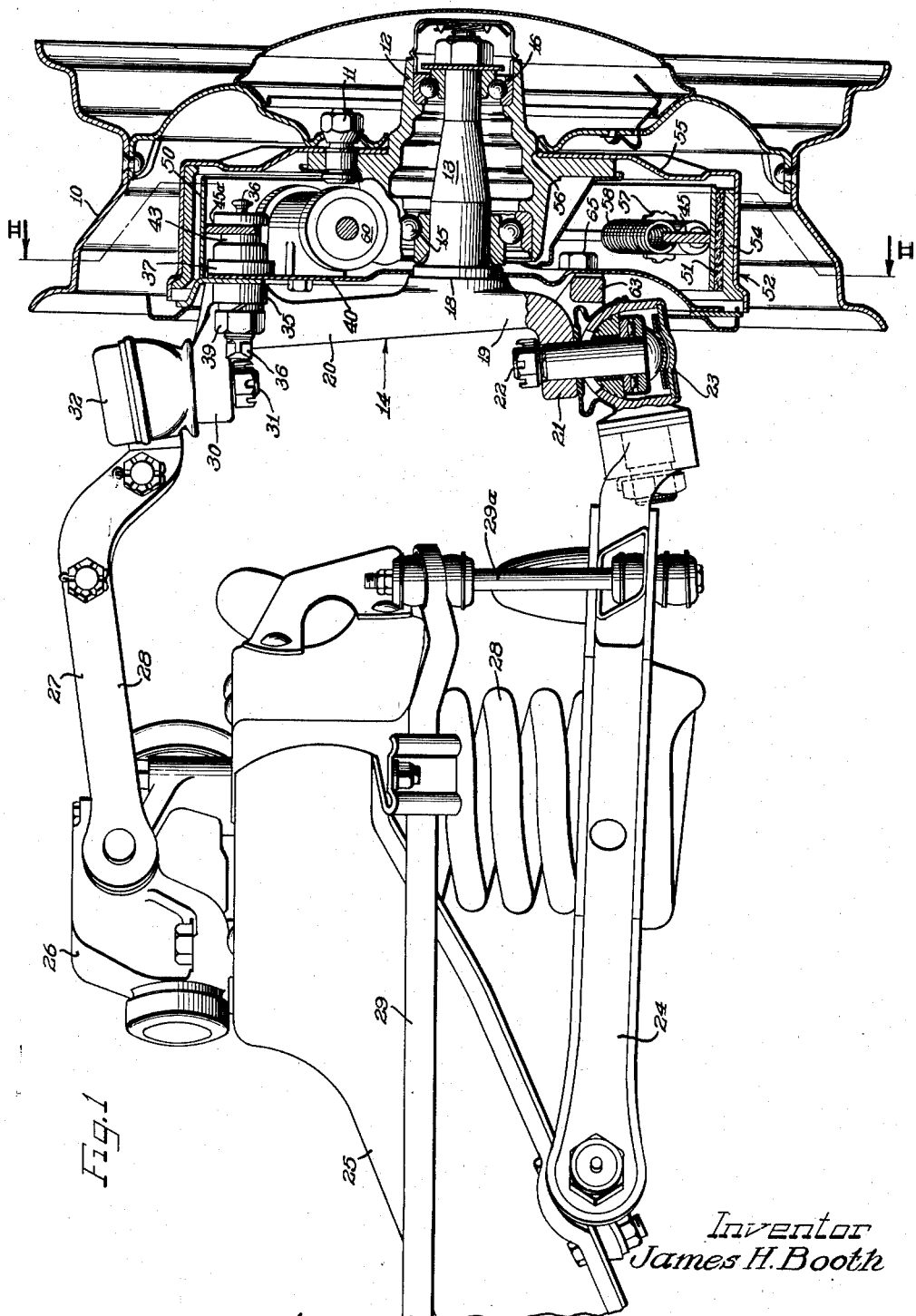

Dec. 30, 1952          J. H. BOOTH          2,623,613

BRAKE MOUNTING FOR INDEPENDENT WHEEL SUSPENSION

Filed July 27, 1948          2 SHEETS—SHEET 1

Inventor
James H. Booth
By The Firm of Charles H. Hill Attys

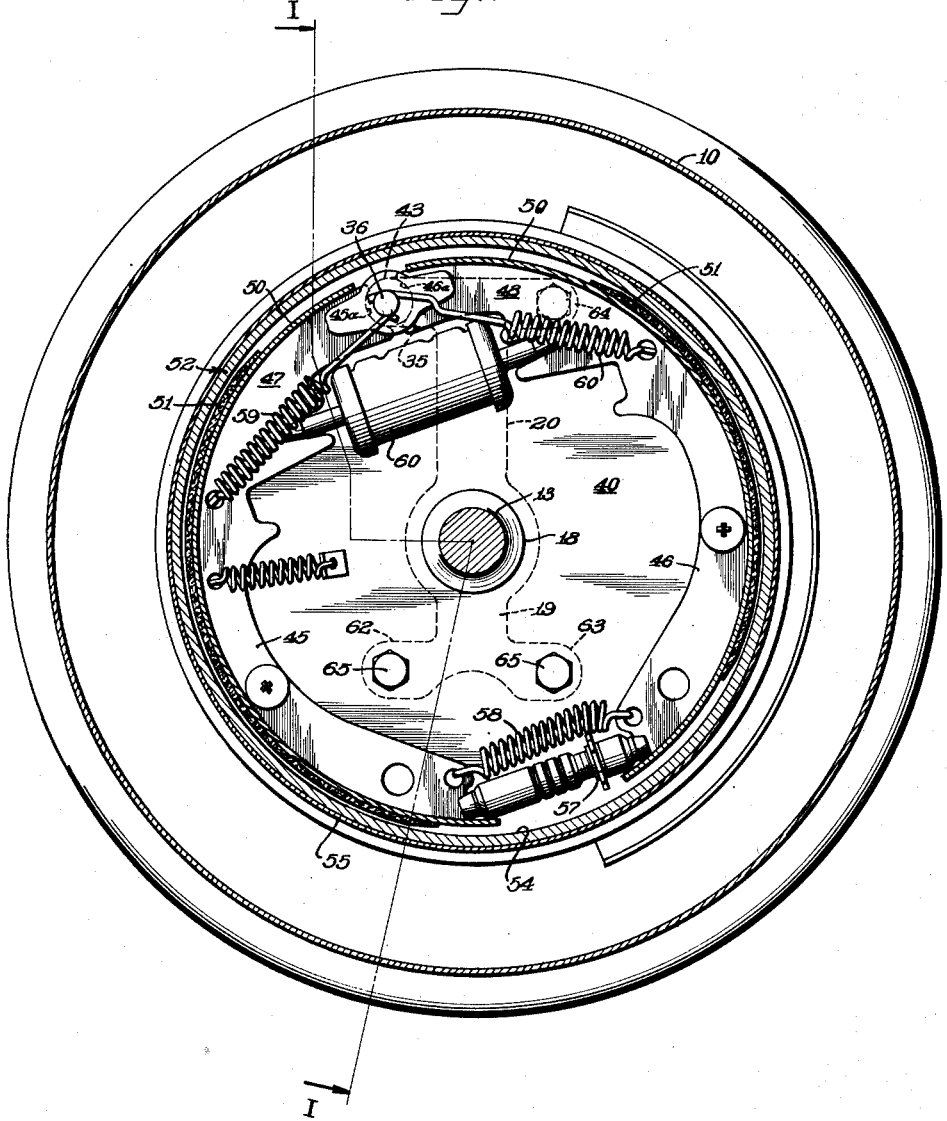

Patented Dec. 30, 1952

2,623,613

UNITED STATES PATENT OFFICE 2,623,613

BRAKE MOUNTING FOR INDEPENDENT WHEEL SUSPENSION

James H. Booth, Venice Township, Shiawassee County, Mich., assignor to Thompson Products, Inc., Cleveland, Ohio, a corporation of Ohio Application July 27, 1948, Serial No. 40,892

1 Claim. (Cl. 188—18)

This invention relates to a brake mounting. More particularly this invention has to do with an improved brake mounting for an independent wheel suspension system wherein the customary king pin assemblies are replaced by pivotal spindle arms on which the brake shoes of each brake assembly are mounted.

In an automotive type hydraulic braking system the member on which the brake shoes are pivotally mounted for movement toward and away from the brake drum must be a member rigid enough to firmly anchor the shoes and must also be a member that is mounted for pivoting, swinging movement with the steering movement of the wheel.

Heretofore, brake shoes have been mounted on a substantially circular plate member, known as the brake backing plate, which is rigidly secured to the pivoting portion of the steering knuckle and king pin assembly. This backing plate must of necessity be a heavy, relatively thick member since it must resist any tendency to bend or buckle when the brakes are applied. The use of a heavy brake backing plate is undesirable since it is an expensive member and requires a substantial support mounting.

According to the present invention there is provided a front wheel suspension including an upper and a lower control arm, each of which is pivotally connected at one end to the frame of the vehicle and connected at its free end through a ball joint to a spindle arm member extending radially outwardly from the spindle body. This spindle arm, mounted between the free end of the upper and lower control arms on ball joints, is arranged for pivoting, steering movement relative to the frame of the vehicle.

The spindle arm has an elongated shape and is provided at a point removed from the axis of the spindle with a lug extending laterally of the main body of the arm which is drilled to receive one end of the brake shoe anchor pin. anchored directly to the spindle arm and the Thus, in this invention the brake shoes are anchored directly to the spindle arm and the necessity for a heavy backing plate is eliminated. A relatively thin backing plate, made of sheet metal, may be secured across the open side of the brake assembly to prevent dirt and dust from entering the brake mechanism.

Accordingly, it is an object of this invention to provide an improved means for rigidly anchoring the brake shoes of an automotive type braking mechanism.

Another object of this invention is to provide an improved spindle arm adapted to receive and firmly hold the brake shoe anchor pin.

A further object of this invention is to provide an improved spindle arm arranged to receive the brake shoe anchor pin and to support a brake enclosing backing plate.

Other and further features, objects and advantages of this invention will be apparent to one skilled in the art from the following detail description of the annexed sheets of drawings which illustrate one embodiment of the invention.

On the drawings:

Figure 1 is a fragmentary front elevational view, partly in section and partly broken away, along the line I—I of Figure 2, of the brake shoe mounting of this invention shown mounted on the spindle arm of an independent wheel suspension; and Figure 2 is a vertical sectional view taken substantially on line II—II of Figure 1.

As shown on the drawings:

In Figures 1 and 2 the reference numeral 10 indicates a wheel secured by a plurality of bolts 11 to a wheel hub 12 which is journaled for rotation on the stub axle 13 of a spindle 14 on ball bearing assemblies 15 and 16.

The spindle 14 includes a central body portion 18 for anchoring the stub axle 13 and integral arm members 19 and 20 which extend in opposite directions away from the body portion 18. The arm 19 has an apertured turned-in flange 21 at the bottom thereof arranged to receive the shank 22 of a ball stud extending from a ball joint 23. This joint is suitably secured to the lower control arm 24 of an automotive type wheel suspension including a cross frame member 25 of the vehicle to which the lower control arm 24 is pivotally attached. A shock absorber 26 is secured to the frame member 25, and an upper control arm 27 is pivotally mounted from the shock absorber. A coil spring 28 extends between the lower control arm 24 and the frame 25, and a torsion rod 29 is connected through a rubber bushed link 29a to this lower control arm.

The spindle arm 20 is aligned with the arm 19 and has an apertured turned-in top end flange 30 receiving the shank 31 of a stud extending from a ball joint 32 which is secured to the upper control arm 27.

It will be readily seen that the integral spindle arms 19 and 20 provide with the central body 18 an upright rigid spindle 14 mounted in a wheel suspension system for pivoting in a substantially vertical plane to provide the knee action and for rotation in the ball joints to provide free steering action.

As best seen in Figure 2, the spindle arm 20 extends for a considerable distance above the axis of the stub axle 13 and is provided near its upper end with an ear or lug 35 extending laterally of the main body of the arm 20. The lug 35 has an aperture receiving an anchor pin 36 which has an enlarged head 37 (Figure 1) on the outer side of the lug 35 arranged to be drawn toward the lug 35 by a nut 39 threaded on the pin 36 on the other side of the lug. A backing plate 40 of relatively thin sheet metal may be held in place between the head 37 and the lug 35 to cover the brake drum assembly and to prevent dust and dirt from entering the mechanism.

The anchor pin 36 has a grooved portion 43 outwardly of the head 37 of circular cross section and eccentric to the axis of the pin 36. This portion 43 is arranged to receive in close abutting contact arcuate recessed end portions 45a and 46a of flanges 45 and 46 of segmental circular brake shoes 47 and 48.

Each brake shoe 47 and 48 has a substantially T-shaped cross section formed by the flange portions, as flange 45 illustrated in Figure 1, and a fragmental cylindrical rim portion 50 integral with the flange. Brake lining 51 is secured as by riveting to the exterior of the cylindrical rim portion 50 of each brake shoe.

A brake drum 52 of standard construction surrounds the brake assembly and includes a cylindrical brake shoe contacting portion 54 and a skirted disk member 55 surrounding the drum and covering the front face of the assembly and having an aperture 56 receiving the hub member 12. The web member 55 may be conveniently fastened to the hub 12 and the wheel 10 by the bolts 11 which hold these members together.

Referring to Figure 2, it is seen that each brake shoe assembly may be adjusted relative to the brake drum by rotating the anchor in 36 which, through its eccentric circular portion 43, acts against the arcuate end portions 45a and 46a of the brake shoe flange to urge the brake shoes apart.

At the lower end of the brake mechanism, a notched wheel member 57 acts on telescoped pins to adjust the position of the lower end of the brake shoes relative to the brake drum. A spring 58 is connected between the brake shoes 47 and 48 and springs 59 and 60 are connected between the brake shoes and the anchor pin 36 tending to pull the brake shoe ends against the pin 36 and to pull the shoes away from the brake drum.

A conventional fluid operated power cylinder 60 is suitably secured to the brake shoe flanges 45 and 46 and arranged, when power is applied thereto, to move the brake shoes into braking engagement with the brake drum, against the action of the springs.

As best seen in dotted lines in Figure 2, the spindle arm 19 has laterally extending lugs or ears 62, 63 on the bottom end thereof while the arm portion 20 has a lug 64 on the top end thereof similar to the lug 35 on which the anchor pin is secured. These lugs have openings, receiving bolts 65, for holding the dust cover 40 in position over the brake drum mechanism.

It is to be particularly noted in Figure 2 that the brake shoe assembly has been rotated forwardly or counter-clockwise from the vertical, approximately 19½°, so that the anchor pin 36, in passing through the lug 35, will not interfere with the main portion of the spindle arm 20. It will be understood, of course, that the spindle arm itself will be inclined from 1 to 3° from the vertical to provide the correct caster angle.

From the foregoing description it will be seen that there is provided in this invention a novel type of independent wheel suspension which affords an elongated spindle arm which, while pivotally mounted for accommodating steering movement of the wheel, also provides a rigid member to which may be connected the anchor pin of a brake shoe assembly. With this type of mounting, the heavy, expensive brake backing plate, customarily used for anchoring the brake shoes, may be replaced by a relatively thin cover member which only functions to exclude dirt and dust from the mechanism. A particular feature of this invention is the lug member which provides the anchoring means on which the anchor pin may be secured and which is so designed for projecting laterally from the spindle that the anchor pin will not interfere with the operation of the spindle. Further, this lug and spindle arrangement provides a construction that is economical to manufacture and easy to install in the brake mounting.

It will, of course, be understood that various details of construction may be varied through a wide range without departing from the principles of this invention, and it is, therefore, not the purpose to limit the patent granted hereon otherwise than necessitated by the scope of the appended claim.

I claim as my invention:

In a vehicle wheel suspension, a thick upright spindle bar including inturned upper and lower terminal ends having generally vertical apertures therethrough, a pair of ball joints for suspending said spindle from a vehicle and disposed respectively above and below said upper and lower ends and having shank portions extending through said apertures, a pair of nuts threaded on said shank portions respectively below and above said upper and lower ends of said thick upright spindle bar and securely fastening said ball joint thereto, a stub axle projecting outwardly from a central portion of said thick upright bar for carrying a vehicle wheel, said thick spindle bar having a thin sheet metal brake drum backing plate mounted thereagainst and including first and second integral pairs of ears projecting forwardly and rearwardly adjacent said upper and lower ends respectively of said bar and having horizontal apertures therethrough for bolting of the thin brake drum backing plate thereto, a brake anchor pin bolted in the horizontal aperture of one of said upper pairs of ears and supported independently from the backing plate, all of said horizontal apertures being out of alignment with said upper and lower terminal ends of said thick upright spindle bar and said ball joints for ready bolting and unbolting of said brake anchor pin and the brake backing plate to and from said upright spindle bar without disassembly of said ball joints from said bar.

JAMES H. BOOTH.

REFERENCES CITED

The following references are of record in the file of this patent:

UNITED STATES PATENTS

| Number | Name | Date |
|---|---|---|
| 1,565,614 | Anibal | Dec. 15, 1925 |
| 1,597,498 | Yocom | Aug. 24, 1926 |
| 1,620,073 | Christensen | Mar. 8, 1927 |
| 1,876,110 | Van Runst | Sept. 6, 1932 |
| 1,908,459 | Thomas | May 9, 1933 |
| 2,168,700 | Burnett | Aug. 8, 1939 |
| 2,173,973 | Leighton | Sept. 26, 1939 |
| 2,190,978 | Dick | Feb. 20, 1940 |
| 2,226,406 | Krotz | Dec. 24, 1940 |
| 2,294,329 | Ayers et al. | Aug. 25, 1942 |
| 2,389,096 | Walker | Nov. 13, 1945 |
| 2,556,767 | McCann | June 12, 1951 |

FOREIGN PATENTS

| Number | Country | Date |
|---|---|---|
| 191,500 | Great Britain | July 18, 1922 |
| 462,816 | Germany | July 19, 1928 |